Oct. 29, 1946.  J. P. BAGAN  2,410,003
SPIRAL CUTTER FOR ROTARY PLOWS
Original Filed April 29, 1940  2 Sheets-Sheet 1
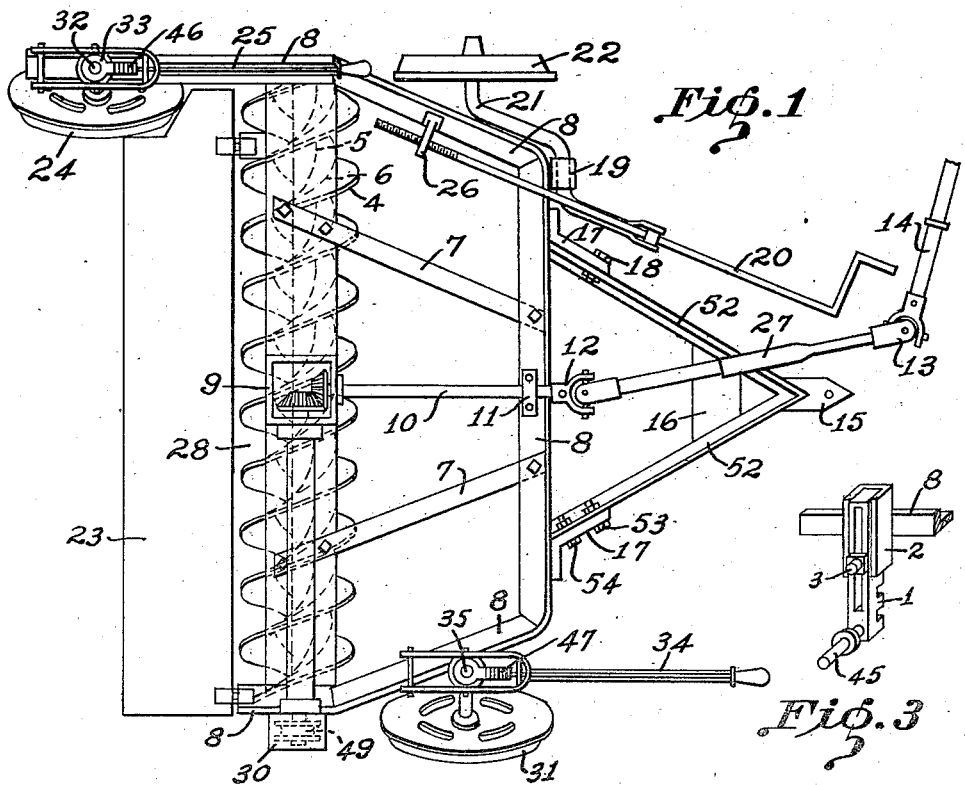
Fig. 1
Fig. 3
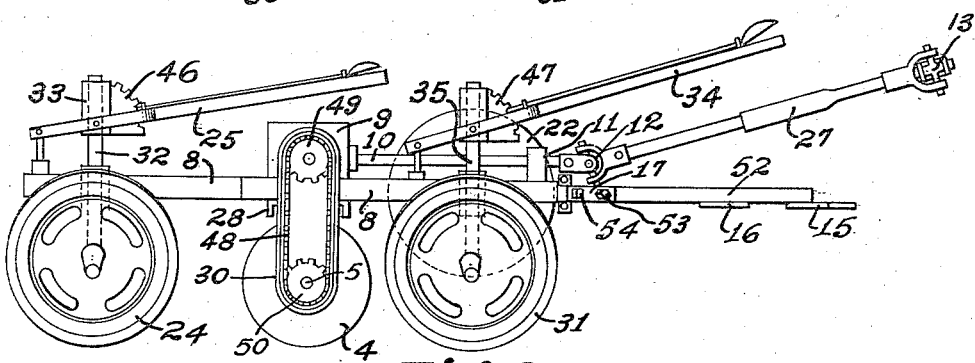
Fig. 2
Fig. 6  Fig. 4  Fig. 5
*Inventor:*
JOHN PETER BAGAN
By Pierce & Scheffler
*Attorneys*

Oct. 29, 1946.  J. P. BAGAN  2,410,003
SPIRAL CUTTER FOR ROTARY PLOWS
Original Filed April 29, 1940  2 Sheets-Sheet 2
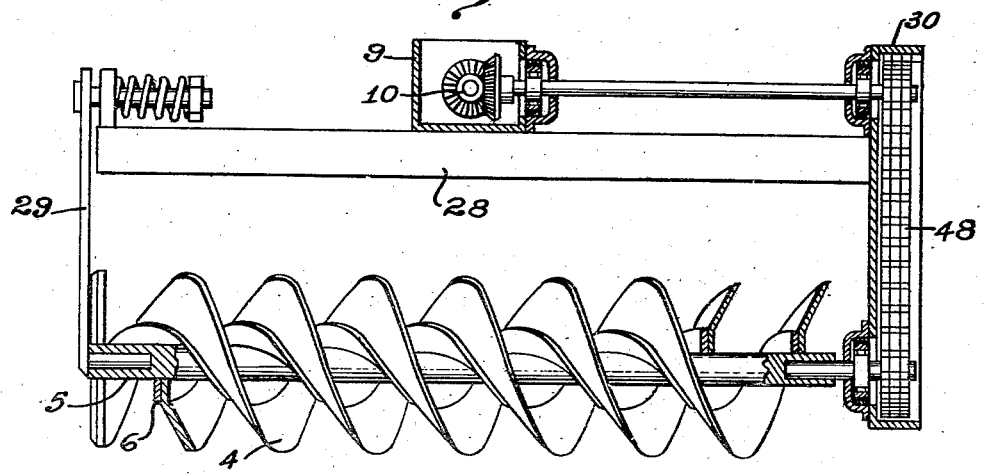
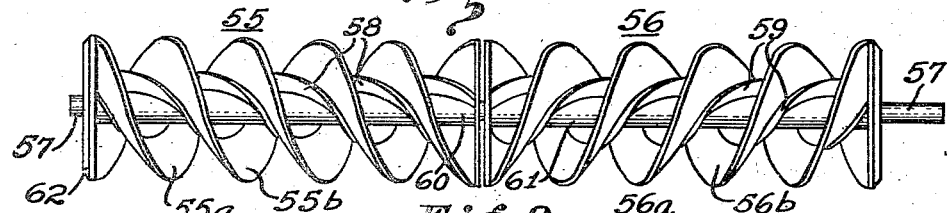
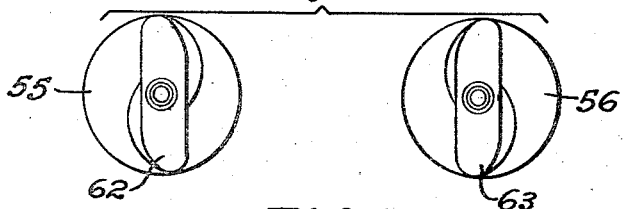
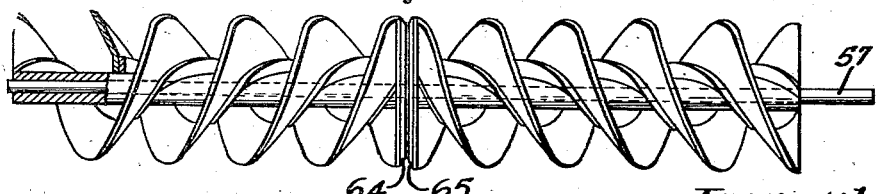
Inventor:
JOHN PETER BAGAN
By Pierce & Schiffler
Attorneys Patented Oct. 29, 1946

2,410,003

UNITED STATES PATENT OFFICE 2,410,003

SPIRAL CUTTER FOR ROTARY PLOWS

John Peter Bagan, Portland, Oreg., assignor of one-third to Anthony R. Wanezek, Marshfield, Oreg.

Original application April 29, 1940, Serial No. 332,220. Divided and this application February 14, 1944, Serial No. 522,320

3 Claims. (Cl. 97—41)

This application relates to a spiral cutter construction for use in rotary spiral plows of the type disclosed in my application Serial No. 332,-220, filed April 29, 1940 (now Patent No. 2,342,-030), and is a division of said application.

The invention of this application resides in a cutter which is so designed i. e. having a right helicoidal portion adjacent the axis thereof and an oblique helicoidal portion adjacent the periphery thereof, the right helicoidal portion being of substantially the same thickness as the oblique helicoidal portion and therefore offering no substantial obstruction to the passage of soil through the cutter in a direction perpendicular to its axis, and the two halves or substantially equal end portions of the cutter being mounted on the same straight shaft to rotate together in the same direction but being of opposite pitch so that the end thrust of each portion due to its rotation in contact with the soil is counteracted by the substantially equal and opposite thrust of the other portion.

It will be understood that a properly designed cutter as described above and as more fully disclosed in my application Serial No. 332,220 above referred to does not, in operation, act to any great extent as a screw conveyor to move the dirt which it engages, laterally. It acts rather to cut the soil, pick it up and drop it again in substantially its original position. However, due to its spiral or helicoidal shape some end or lateral thrust occurs and the object of the invention is to counteract the end thrust of one portion of the cutter by an equal and opposite end thrust of the other portion of the cutter so that the plow carrying the cutter easily may be held on its straight forward course. It will be apparent that the purpose and result of dividing the helicoidal cutter into two parts with their pitches in opposite directions is not for the purpose of producing either gutters or ridges in the cultivated ground due to lateral movement of the soil. As has been pointed out above, such lateral movement of the soil does not occur to any great extent with the design of cutter disclosed in my application Serial No. 332,220, and the object of the present invention therefore is merely to steady the operation of the plow.

The invention is illustrated in the accompanying drawings, in which,

Fig. 1 is a plan view of a plow embodying my invention;

Fig. 2 is a side view thereof;

Fig. 3 is a fragmentary perspective view of a wheel bracket and a guide;

Fig. 4 is a fragmentary perspective view of said wheel bracket;

Fig. 5 is a fragmentary perspective view of the guide;

Fig. 6 is a detailed view of the operating mechanism for adjusting a wheel to the frame of said plow;

Fig. 7 is a rearward elevation of the cutter blade and operating devices therefor, embodying my invention, some of said parts being shown in section to disclose features thereof;

Fig. 8 is an elevation of a modified type of cutter blade designed to prevent end thrust;

Fig. 9 is a more or less schematic view illustrating the construction of the ends of the cutter embodying the modification illustrated in Fig. 8;

Fig. 10 is a view similar to Fig. 8 with the spirals shown reversed and with parts shown broken away to disclose detailed construction.

Referring to the structure illustrated in Figs. 1 to 7 of the drawings:

A plow embodying my invention comprises a cutter blade 4 mounted upon a cutter shaft 5. Said cutter blade is mounted upon a center spirally wound flange 6 welded or otherwise secured to the cutter shaft 5. A frame supporting said cutter blade comprises braces 7 and a main angle iron frame 8. A gear housing 9 is supported on the transverse channel member 28 directly over the cutter blade and a shaft 10 extends forward thereof. The forward end of said shaft 10 is journalled in a bearing 11 supported by the frame 8. A drive shaft sleeve 27 is operatively connected to shaft 10 through a universal joint 12. Another universal joint 13 joins said drive shaft sleeve 27 to the power shaft 14 leading to the power take-off of a tractor (not shown) for drawing and powering said plow. A bracket 15 is used for attaching the draw bar hitch 52 to said tractor. Said draw bar hitch has a brace 16 extending transversely thereof and is joined to the frame 8 by a pair of adjustable brackets 17 and bolts 18, 53 and 54.

A depth gauge wheel 22 carried by an offset axle 21 is supported by bearing 19. A screw lift rod 20 engaging a threaded bracket 26 is adapted to rotate said axle in said bearing to fix the vertical height of said depth gauge 22. Trailing the cutter blade is a dirt shield 23, and a furrow wheel 24 lies at the same side of the frame as does the depth wheel 22, but rearwardly thereof. Said furrow wheel 24 may be adjusted for height by a ratchet lever 25. This is shown more clearly in Fig. 2. Said wheel 24 is carried by a vertically adjustable axle 32 having a sleeve 33 fixed thereto. A quadrant 46 is engaged by the pawl on ratchet lever 25 to fix the height at which said furrow wheel axle is lifted.

At one end of said channel member 26 is mounted a housing 30 for enclosing an endless chain 48 engaging sprockets 49 and 50. The cutter blade 4 is rotated by power transmitted from shaft 10 through said chain and sprockets in the manner illustrated in Figs. 1 and 7.

More or less transversely aligned with depth gauge wheel 22 but on the opposite side of the frame, is front furrow wheel 31. Said furrow wheel is adjustable as to height by ratchet lever 34 which is adapted to engage a sector of teeth 47 to lift and lower said wheel 31 in the manner similar to the structure for lifting and lowering furrow wheel 24 by manipulation of the axle 35 for said wheel 31.

If it is desired to use this type of plow for orchard cultivation, I remove the front furrow wheel 31 and the structure associated therewith and substitute a special frame bracket illustrated in Figs. 3, 4 and 5. This bracket comprises a notched rack 1 carrying wheel axle 45 and a notched bracket 2 adapted to be secured to a portion of frame 8. When the complementary notches on said bracket and said rack are in engagement, they may be held fast by threading a nut onto bolt 3 and securing said parts tightly in place.

Another type of wheel adjustment is illustrated in Fig. 6, which is capable of being operated by means of a crank. In said modification a housing 37 is secured to the plow frame 8 and a tapped pinion 40 is threaded upon axle rack 38. Then when pinion 40 is rotated by meshing with gear 41, said rack is moved up and down when crank rod 39 is rotated. Said crank rod 39 is journalled in a bracket 42 adjacent the handle portion and is journalled adjacent gear 41 in housing bracket 44. Wheel axle 51 extends laterally from shaft 38 and thus said axle and the wheel carried thereby will be shifted vertically by the rotation of the internally tapped gear 40, by the mechanism previously described.

The ends of shaft 5 are supported to the frame 7, 8, 28 in bearings carried by the housing 30 and the vertical member 29 (see Fig. 7).

In Fig. 8 I illustrate a cutter blade made up of two oppositely wound oblique helicoidal sections 55 and 56 mounted upon a common shaft 57. Each section comprises two intertwined blades 55a and 55b and 56a and 56b carried by central flanges 58 and 59 welded or secured to tubes 60 and 61 closely surrounding and bearing upon said common shaft 57. At the outer ends of said sections are the cutter blades 62 and 63 (see Fig. 9) extending normally to the axis of rotation of the shaft 57 and serving as slicing cutters to shear off the turf where the aforesaid blade enters the ground. The soil plowed and operated upon by each of said sections tends to be moved slightly in the direction of twist of the oblique helicoid blade sections. In said figure, the material would tend to be shifted slightly toward the center of the cutter and away from the opposite ends thereof. In Fig. 10, I illustrate how said sections can be reversed so that the soil will tend to be shifted towards the opposite ends of the cutter blades. In this embodiment the cutter blades 64 and 65 are adjacent each other on the inner ends of the two sections of the spiral cutter. Independently of whether the blades are arranged as shown in Fig. 8 or Fig. 10, the dirt will not be shifted beyond the swath formed by the entire cutter blade made up of the said two sections.

In operation the rotary cutter is rotated in the same direction as the wheels 22, 24 and 31 of the plow so that the cutter tends to propel the plow forward and does not oppose the forward movement of the plow. The cutter may be rotated at different rates but is always rotated at a rate which is much faster than corresponds to the forward movement of the plow if the cutter were rolling with its periphery in contact with the surface of the ground. For example, whereas the plow may move forward at a rate of from say 1 to 5 miles per hour and the supporting wheels being say 2 feet in diameter may rotate or roll at a rate of from about 15 revolutions per minute to about 75 revolutions per minute, the spiral cutter may rotate at the rate of several hundred revolutions per minute.

I claim:

1. In a rotary spiral plow adapted for tractor operation comprising a frame, wheel supports for the frame, a spiral cutter mounted for rotation on a substantially horizontal axis on said frame, means for coupling said frame to a tractor to propel the same and means for coupling said spiral cutter to a power take off of said tractor to rotate the same, said cutter comprising a straight unitary axial member and two helicoidal blade members of substantially equal and opposite pitch and length mounted substantially end to end on said axial member, each of said blade members comprising an inner right helicoidal portion and an outer oblique helicoidal portion extending outwardly from the outer edge of said inner right helicoidal portion, said portions being of substantially the same uniform thickness and each surface of each blade member being substantially continuous.

2. Rotary plow as defined in claim 1 in which the cutter comprises two portions of substantially equal length and each portion has at least two parallel intertwined blade members.

3. A spiral cutter for rotary plows comprising a straight unitary axial member, and two helicoidal blade members of substantially equal and opposite pitch and length mounted substantially end to end on said axial member, each of said blade members comprising an inner right helicoidal portion and an outer oblique helicoidal portion extending outwardly from the outer edge of said inner right helicoidal portion, said portions being of substantially the same uniform thickness and each surface of each blade member being substantially continuous.

JOHN PETER BAGAN.